(12) United States Patent
Matsui et al.

(10) Patent No.: US 7,090,221 B2
(45) Date of Patent: Aug. 15, 2006

(54) SEAL DEVICE

(75) Inventors: Shingo Matsui, Saitama (JP); Yoshiaki Takigahira, Saitama (JP)

(73) Assignee: Eagle Industry Co., Ltd., Tokyo (JP)

( * ) Notice: Subject to any disclaimer, the term of this patent is extended or adjusted under 35 U.S.C. 154(b) by 138 days.

(21) Appl. No.: 10/501,908

(22) PCT Filed: Dec. 3, 2002

(86) PCT No.: PCT/JP02/12664

§ 371 (c)(1),
(2), (4) Date: Jul. 20, 2004

(87) PCT Pub. No.: WO03/062682

PCT Pub. Date: Jul. 31, 2003

(65) Prior Publication Data

US 2004/0262845 A1    Dec. 30, 2004

(30) Foreign Application Priority Data

Jan. 21, 2002    (JP)    ............... 2002-012219

(51) Int. Cl.
*F16J 15/34*    (2006.01)

(52) U.S. Cl. .............. 277/352; 277/353; 277/370; 277/390; 277/394

(58) Field of Classification Search ........ 277/352–353, 277/370–373, 390, 394
See application file for complete search history.

(56) References Cited

U.S. PATENT DOCUMENTS

| | | | | |
|---|---|---|---|---|
| 3,511,513 A | * | 5/1970 | Dahlheimer | ................. 277/353 |
| 4,311,315 A | * | 1/1982 | Kronenberg | ................. 277/397 |
| 4,421,326 A | * | 12/1983 | Drygalski | ................. 277/552 |
| 4,428,586 A | * | 1/1984 | Romero | ................. 277/565 |
| 4,861,172 A | * | 8/1989 | Rudolf et al. | ................. 384/477 |
| 4,968,044 A | * | 11/1990 | Petrak | ................. 277/380 |
| 5,219,434 A | * | 6/1993 | Von Bergen et al. | ....... 277/351 |
| 5,794,940 A | * | 8/1998 | Brueggmann | ............. 277/364 |
| 5,813,675 A | * | 9/1998 | Otto | ................. 277/549 |
| 6,050,571 A | * | 4/2000 | Rieder et al. | ............. 277/353 |
| 6,257,587 B1 | * | 7/2001 | Toth et al. | ................. 277/309 |

FOREIGN PATENT DOCUMENTS

| | | |
|---|---|---|
| JP | 62-185977 | 11/1987 |
| JP | 2-148705 | 12/1990 |
| JP | 07-019350 | 1/1995 |
| JP | 2001-304423 | 10/2001 |

* cited by examiner

*Primary Examiner*—Vishal Patel
(74) *Attorney, Agent, or Firm*—Arent Fox PLLC

(57) ABSTRACT

A seal contact surface of a seal lip member and a protruding lip member of an end face seal are separated from each other and frictional heat generated at the seal lip member due to sliding motion is prevented from being transferred to the end face seal for softening the material, thus the seal capability is improved. A protruding lip member (3) provides a seal by making an angle to a seal surface (11B) of a seal ring (11) in radially outward a direction and a lip portion (15A) of a seal lip member (15) is disposed inside an inner diameter surface (11A) of the seal ring (11) for effecting a seal against a sealing object fluid.

9 Claims, 5 Drawing Sheets

SEAL DEVICE

CROSS-REFERENCE TO RELATED APPLICATION

This application is a National Stage entry of International Application No. PCT/JP02/12664, filed Dec. 3, 2002, the entire specification claims and drawings of which are incorporated herewith by reference.

TECHNICAL FIELD

The present invention relates to a seal device for effecting a seal by establishing a sealing contact between oppositely facing seal surfaces of a pair of a seal portion and an end seal face. More particularly, this invention relates to a seal device for use in various rotary machines providing a seal against sealing object fluid under a condition that a pressure of the sealing object fluid becomes high or randomly varies between a high pressure and a low pressure.

BACKGROUND ART

Related art of the present invention is found as a shaft seal device 100 as shown in FIG. 5.

A case 101 of the shaft seal device 100 shown in FIG. 5 is closely inserted and fixed in an inner circumference of a housing 110 through an O-ring 106. On an inner circumference of the casing 101 there are arranged an elastomer lip member 102 and a reinforcement ring 103 which supports the elastomer lip member 102 from its rear side.

In addition, on a rear side of the reinforcement ring 103 which is a side opposite to a sealing object fluid, a resin lip member 104 and a back-up ring 105 which is additionally provided on the rear of the resin lip member 104 and supports the rear are disposed. Each outer diameter portion of the elastomer lip member 102, the reinforcement ring 103, the resin lip member 104 and the back-up ring 105 are securely held onto an inner circumference of the casing 101.

In the shaft seal device 100 of this kind, the elastomer lip member 102 has pumping threads 102b which cause a pumping action in a direction which pushes back the sealing object fluid according to the rotation of a rotary shaft 120 and are formed on an inner circumferential surface of a seal lip portion 102a of an inner diameter side extending to the inner space of machine S1 side. On the other hand, the resin lip member 104 has pumping threads 104b which pushes back the fluid toward the elastomer lip member 102 side when the shaft 120 rotates and are formed on an inner circumferential surface of its seal lip portion 104a.

The pumping threads 104b in the seal lip portion 104a of the resin lip member 104 are formed at only around a front end of a sliding surface with the rotary shaft 120. This is because there is a need for preventing the fluid from leaking toward an atmosphere S2 side after passing the pumping threads 104b when the rotary shaft 120 stops.

In the shaft seal device 100 of this kind, under a high pressure condition in which the fluid pressure of the inner space of machine S1 is at least 1 MPa, the resin lip member 104 receives an influence of the pressure, thus its section is deformed into an L-shape.

A stress of the front end portion of the seal lip portion 104a in the deformation process is relatively small by the presence of the pumping threads 104b, and a stress generated in the vicinity of a bent portion 104c in which the pumping threads 104b are not formed is relatively large.

Therefore a maximum portion of a surface pressure acted on the outer circumferential surface of the rotary shaft 120 is locally distributed toward the bent portion 104c side. Accordingly, the inner circumferential surface in the vicinity of the bent portion 104c is easily worn.

And the front end portion in which the pumping threads 104b are formed causes a floating deformation on the outer circumferential surface of the rotary shaft 120. As a result, the pumping action of the pumping threads 104b for blocking a fluid leakage is damaged and a sealing capability during the rotary operation is lowered.

Further, the elastomer lip member 102 and the resin lip member 104 are arranged in close proximity of each other. If a sliding surface of the resin lip member 104 is pressed against the rotary shaft 120 and a sliding friction causes a generation of substantial heat, the heat generated is transferred to the elastomer lip member 102.

A similar heat generation is resulted if a high pressure due to the sealing fluid presses the elastomer lip member 102 against the rotary shaft 120. This heat then causes softening of the seal lip portion 102a of the elastomer lip member 102 and the seal lip portion 104a of the resin lip member 104. In particular, a progress of wear in the seal lip portion 102a causes a decrease in the seal capability.

Wear of the seal lip portion 102a of the elastomer lip member 102 and the seal lip portion 104a of the resin lip member 104 also causes wear particles to stick onto the sliding surfaces of the individual seal lip portions 102a, 104a, thus the seal capability is damaged.

In case of a conventional rotary shaft 120, the seal lip portion 102a of the elastomer lip member 102 and the seal lip portion 104a of the resin lip member 104 tend to be quickly worn during the rotation of the rotary shaft 120 wherein the seal lip portions 102a, 104a are firmly pressed against the rotary shaft 120. On the other hand, the rotary shaft 120 which is a kind of machine component embedded inside a machine assembly unit is not only expensive but also hard to be replaced. That is, when the seal surfaces of the seal lip portion 102a of the elastomer lip member 102 and the seal lip portion 104a of the resin lip member 104 are subjected to a sliding movement relative to the worn rotary shaft 120, wear of the both seal surfaces is further accelerated and, as a result, the seal capability of the shaft seal device is decreased.

The present invention is introduced to alleviate the above mentioned problems. A primary technical goal which this invention tries to achieve is to improve a seal capability of various rotary machines even under a circumstance wherein a rotary shaft repeats stop and go motions or a fluid pressure randomly changes between high pressure and low pressure.

Another technical goal is to prevent the seal capability from being damaged as the result of softening of an end face portion of a rubber-made lip member which is caused by a transfer of a frictional heat from a resin-made seal lip member in operation.

Yet another goal is to achieve low energy consumption by means of reducing sliding resistance of the seal lip member and the end face lip member and to simplify the assembly and maintenance process of the seal device.

DISCLOSURE OF THE INVENTION

A primary object of the present invention is to alleviate the above mentioned technical disadvantages, and a solution to such disadvantages is embodied as follows.

A seal device of the most preferred embodiment related to the present invention is a seal device for providing a seal against a sealing object fluid between a rotary shaft and a housing accommodating the rotary shaft extending therethrough, the seal device comprising a seal ring being mounted onto the housing and having a seal surface, a seal lip member being arranged in the opposite side of the seal surface of the seal ring wherein an outer peripheral portion of the seal lip member is mounted on the housing and the seal lip member has a lip portion and the lip portion is brought into fitting close contact with the rotary shaft, and a face end seal opposing to the seal ring and being fixed on the rotary shaft in a fluid tight seal manner wherein the face end seal has a protruding lip member which extends from one end portion toward the seal surface and is capable of forming close contact with the seal surface. The protruding lip member is at an angle to the seal surface in radially outward a direction which is in the fluid side and the lip portion of the seal lip member is disposed inside an inner diameter surface of the seal ring for effecting a seal against the fluid.

The seal device of the preferred embodiment related to the present invention includes a pair of a seal portion and an end face seal portion which are arranged to oppose against each other wherein the seal portion accommodates a seal lip member and a seal ring therein, thus mounting to rotary machines or dismounting for repair is made straightforward.

Further, even if either one of the seal portion or the end face seal is worn, only the worn component can be replaced. In particular, when a sliding surface of the rotary shaft is worn, it is difficult to replace the rotary shaft because it is embedded in the device. The seal ring, however, is a replaceable, single component and it is straightforward to replace.

Also if the protruding lip member is assumed to be brought into close contact with the rotary shaft, it is difficult to precisely machine the sliding surface of the rotary shaft where the contact with the protruding lip member is made. It, however, is straightforward to achieve a mirror surface finishing on the seal surface of the seal ring which is brought into close contact with the protruding lip member.

The rotary shaft cannot be made of hard material due to its functional reason, but as the seal ring is made of hard material such as silicon carbide or the like, sliding wear of the seal ring can be prevented. This makes it possible not only to improve the durability of the seal device but also to substantially reduce the production cost.

Further, the protruding lip member which makes close contact at its tip surface with the seal surface of the seal ring can accommodate a contact force depending on the magnitude of a fluid pressure acting on the protruding lip member. That is, if the fluid pressure is not high, then a sliding resistance can be decreased, which leads to a reduction of the rotary driving energy.

The seal lip member is brought into close contact with the rotary shaft while the protruding lip member is brought into close contact with the seal ring which is located distal from the rotary shaft. This prevents frictional heat of the seal lip member due to its sliding motion from being transferred to the protruding lip member and a possible damage in the seal capability caused by softening of the protruding lip member because of the rising temperature.

Wear particles of the seal lip member produced under the sliding motion do not accumulate on the seal surface which is perpendicular to the sliding surface of the seal lip member. That is, it is possible to prevent the seal surface from getting worn during sliding by the wear particles sticking to the seal surface and the protruding lip member.

Further, the protruding lip member is brought into close contact with the seal ring while the lip portion is brought into close contact with the rotary shaft, thus the non-contact state of the rotary shaft and the seal ring does not involve a heat transfer therebetween. This allows the protruding lip member and the lip portion to be disposed in close proximity from each other and the entire seal portion can be built compact.

According to a seal device related to the second embodiment of the present invention, the seal lip member is made of synthetic resin material and the protruding lip member is made of rubber material.

In the seal device of the second embodiment related to the present invention, the seal capability can effectively be improved by providing a seal during the rotation of the rotary shaft by means of the seal lip member being made of a low frictional synthetic resin while providing a seal at a halting state of the rotary shaft by means of the protruding lip member which is made of a rubber material with a high seal capability.

In particular, under circumstances where the rotary shaft repeats stop-and-go motion or the fluid pressure is subject to a random variation between high pressure and low pressure, the combination of the materials for the respective lip portions in the seal device thus arranged exhibits an outstanding performance.

According to a seal device related to the third embodiment of the present invention, a backup ring is disposed on an inner circumferential surface of the protruding lip member and provides a support for the protruding lip member.

In the seal device of the third embodiment related to the present invention, if the rotary shaft repeats stop-and-go motion or the fluid pressure repeatedly changes between high pressure and low pressure, the protruding lip member is acted on by a varying pressure. The backup ring, however, supports the protruding lip member in a pressure proof manner against the varying pressure for an improved seal performance.

According to a seal device related to the fourth embodiment of the present invention, a pressure receiving area of the end face seal which a sealing object fluid acts on and is located in an outer circumferential side of the protruding lip member is arranged larger than an opposite pressure receiving area which is located on a back end face of the end face seal.

In the seal device of the fourth embodiment related to the present invention, merely mounting the end face seal onto the rotary shaft enables the end face seal to be securely urged against the step shoulder portion of the rotary shaft due to a fluid pressure because a pressure receiving area located in the protruding lip member side is arranged larger than another pressure receiving area of the opposite surface of the end face seal. Therefore, the construction of the mounting portion of the end face seal is arranged extremely simple and its mounting task also can be made straightforward.

According to a seal device of the fifth embodiment related to the present invention, the face end seal retains a reinforcement ring therein which has an inner circumferential support portion and the inner circumferential support portion is supported by a detent.

In the seal device of the fifth embodiment related to the present invention, fitting the end face seal to the rotary shaft through a circumferential seal contact portion and a side surface seal contact portion enables a secure mount because the inner circumferential support portion of the reinforcement ring is fittingly supported by the detent which is fixed to the rotary shaft. That is, a secure seal contact at the fit surface between the end face seal and the rotary shaft is enforced and the contact state of the protruding lip member relative to the seal surface of the seal ring is improved.

In a seal device of the sixth embodiment related to the present invention, the seal ring and the lip portion are separated from each other with a clearance therebetween and even a heat generation caused by the sliding motion between the lip portion and the rotary shaft does not affect the protruding lip member because of the separation. Further, the lip portion acted on its outer circumference by the fluid is kept in close contact with the rotary shaft and enhances the seal performance of the seal contact surface.

BEST MODE FOR CARRYING OUT THE INVENTION

Described below is details of the figures of preferred embodiments of a strip brush seal device constructed in accordance with the principles of the present invention. All the figures explained below are constructed according to actual design drawings with accurate dimensional relations.

Figure 1:
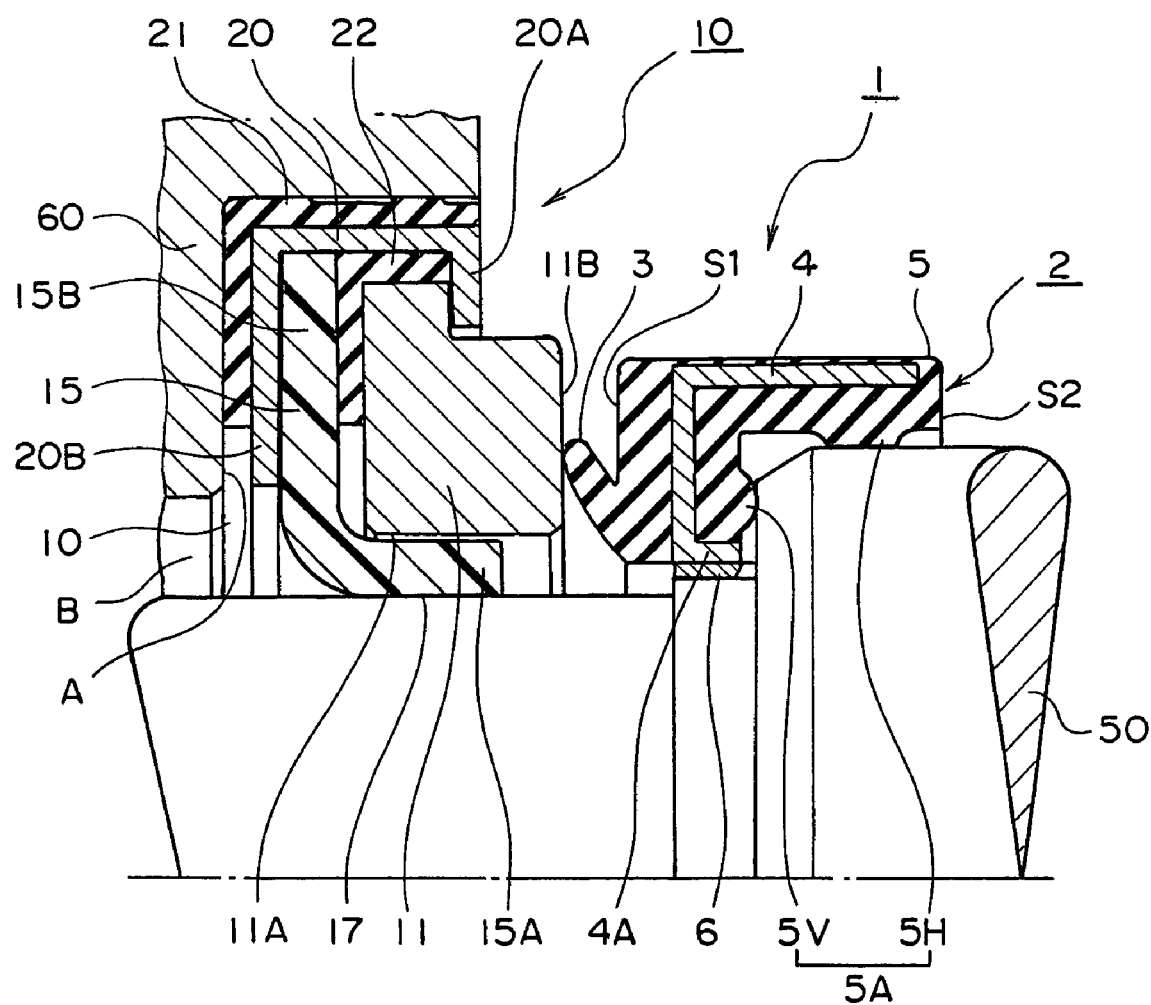
FIG. 1 is a half sectional view showing a preferred embodiment of a seal device mounted according to the present invention.

FIG. 1 is a half sectional view showing a preferred embodiment of a seal device 1 according to the present invention.

In FIG. 1, the seal device 1 is constructed in such a way that an end face seal portion 2 and a seal portion 10, as a pair, oppose against each other. The seal portion 10 has a seal ring 11 and a seal lip member 15 as its primary components.

The end face seal portion 2 has an "L"-shaped cross section with an end face seal body 5. A protruding lip member 3 is disposed at one end of the end face seal body 5 wherein the protruding lip member 3 has a "V"-shaped cross section and extends outward. Also an inner diameter surface and a radially extending inner side wall, respectively, form a circumferential seal portion 5H and a side wall seal portion 5V. The end face seal body 5 is made of rubber material. The end face seal body 5 retains a reinforcement ring 4 therein, which provides the end face seal portion 2 with a structural reinforcement. Further, the reinforcement ring 4 retains an inner circumference support portion 4A in an inner circumference thereof, which has an "L"-shaped cross section.

A first pressure receiving surface S1 is defined as a portion of a front end face of the end face seal portion 2 which is located radially outward with reference to the protruding lip member 3 and receives a fluid pressure. A second pressure receiving surface S2, on the other hand, is defined as a back end face which is opposite to the first pressure receiving surface S1. The first pressure receiving surface S1 is arranged larger in its pressure receiving area than the second pressure receiving surface S2.

The end face seal portion 2 is fitted with a step shoulder of the rotary shaft 50. And the circumferential seal portion 5H is brought into a sealing contact with an outer diameter surface of the rotary shaft 50 and the side wall seal portion 5V also is brought into a sealing contact with an end face of the step shoulder portion of the rotary shaft 50. The inner circumference support portion 4A of the reinforcement ring 4 which is embedded in the end face seal body 5 is securely fixed with the rotary shaft 50 by means of a detent 6. The detent 6 is to keep the end face seal portion 2 coaxial to the rotary shaft 50 while the circumferential seal portion 5H is brought into a secure contact with the rotary shaft 50 by a substantial surface pressure.

The end face seal portion 2 fittingly engaged with the individual surfaces of the step shoulder portion of the rotary shaft 50 arranges the first pressure receiving surface S1 to be larger in area than the second pressure receiving surface S2, thus the end face seal portion 2 is constantly urged against the step shoulder portion of the rotary shaft 50 by a fluid pressure acting on the first pressure receiving surface S1 in an axial direction. In case of an excessive urging pressure, a right front edge portion, as indicated in the figure, of the inner circumference support portion 4A of the reinforcement ring 4 comes into contact with the step shoulder portion of the rotary shaft 50 such that the protruding lip member 3 does not fall apart from the seal surface 11B.

The protruding lip member 3 is disposed at an angle to the seal surface 11B in a radially outward manner. A tip corner portion of the protruding lip member 3, as a seal contact surface, comes into a resilient contact with the opposing seal surface 11B. When a fluid pressure acts on the protruding lip member 3 from a radially outward direction, the protruding lip member 3 undergoes a deformation such that the inclination angle decreases toward a horizontal direction, which intensifies the contact with the seal surface 11B.

On the other hand, the seal portion 10 which is disposed in an opposing manner to the end face seal portion 2 is fittingly fixed to a mounting bore "A" by means of a first packing 21 wherein the mounting bore "A" is arranged coaxial to a through bore "B" of a housing 60 which contains the rotary shaft 50 within the through bore "B" thereof. Thus, the seal portion 10 is fixed to the housing 60 in a seal tight manner.

The seal portion 10 retains an annularly shaped reinforcement case 20 therein which is fixed to the housing through the first packing 21. In the reinforcement case 20, an inner circumference portion defines a support portion 20B for supporting the seal lip member 15 whilst an end portion of an outer circumference portion defines a clamp portion 20A which is bent radially inward for securely holding the seal ring 11.

The reinforcement case 20 and the housing 60 are kept in a fluid-tight seal condition therebetween by means of the first packing 21.

Within the reinforcement case 20, the seal lip member 15 and the seal ring 11 are retained with a second packing 22 being sandwiched therebetween. The second packing 22 provides a secure seal at an outer circumferential surface of the seal ring 11 and an inner circumferential surface of the reinforcement case 20 in order to prevent a fluid leakage therethrough.

The seal lip member 15 is made of a low frictional synthetic resin such as PTFE (polytetrafluoroethylene) or the like. The seal lip member 15 is fabricated from a ring plate as a primary form in its forming process. Applying a bend forming to the ring plate produces a retainer portion 15B in the outer circumference thereof and an axially cylindrical lip portion 15A in the inner circumference thereof. A seal contact surface 17 of the lip portion 15A is brought into fit contact with the rotary shaft 50. In particular, an inner circumferential tip portion of the seal contact surface 17 of the lip portion 15A is brought into seal tight contact with the rotary shaft 50.

The seal ring 11 arranges a seal surface 11B at its end face and an inner diameter surface 11A in its inner circumference. This seal ring 11 is made of a hard material such as quenched steel, super hard metal, ceramics or the like. An outer circumferential portion of the seal ring 11 is sandwiched by the second packing 22 and the clamp portion 20A of the reinforcement case 20. The inner diameter surface 11A of the seal ring 11 is brought into close proximity with a clearance gap to an outer circumferential surface of the lip portion 15A. The gap is arranged in such a way that an extraordinary rising of the tip of the lip portion 15A is blocked by the inner diameter surface 11A.

If the inner diameter surface 11A of the seal ring 11 and the outer circumferential surface of the lip portion 15A are arranged such that a leaking fluid flows between the two components, there is no heat transferred between the two components and no significant problem arises even if a portion of the lip portion 15A comes into contact with the seal ring 11.

Figure 2:
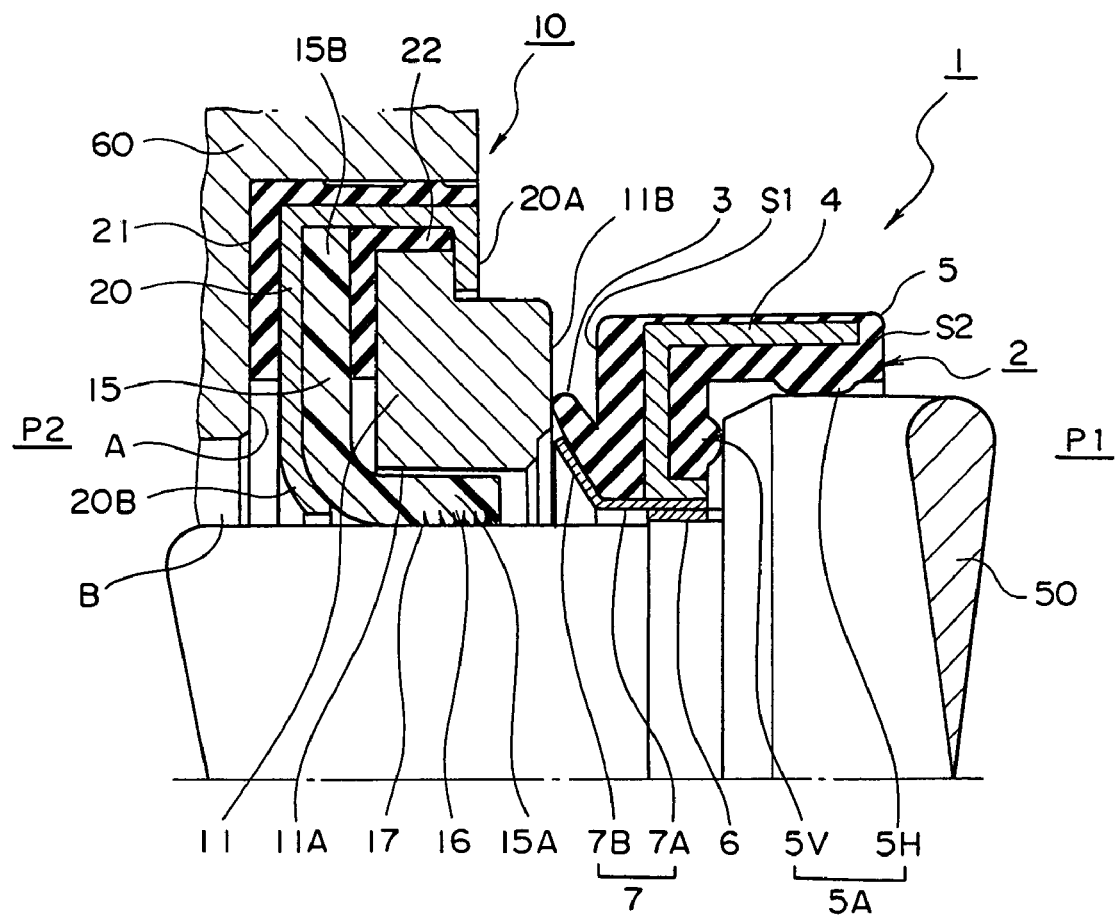
FIG. 2 is a half sectional view showing another embodiment of a seal device mounted according to the present invention.

FIG. 2 is a half sectional view showing a second embodiment of a seal device according to the present invention. In the seal device 1 as the second embodiment, as indicated in FIG. 2, reference numerals which are same as those in FIG. 1 represent same components.

This seal device 1 arranges the side of a sealing object fluid as high pressure region P1 and the opposite side as low pressure region P2. The seal device 1 is also suitable to such cases that a pressure in the high pressure region P1 fluctuates between high pressure and low pressure when the rotary shaft 50 halts or is in motion.

The end face seal portion 2 of the seal device 1 disposes a backup ring 7 in its inner circumferential surface. The backup ring 7 arranges its one end portion as a lip support plate 7B for supporting the inner circumferential surface of the protruding lip member 3. The other end portion of the backup ring 7 is arranged as a total support plate 7A for supporting the end face seal portion 2. The total support plate 7A is engaged with the detent 6 and is fittingly fixed with the rotary shaft 50 through the detent 6.

On the other hand, an inner circumferential support portion 20B of the reinforcement case 20 forms an inner diameter surface which is brought into close proximity to the rotary shaft 50. A circular arc formed by the support portion 20B provides a support for an inflection portion of the seal lip member 15. Further, pumping threads 16 causing the pumping action are formed on the seal contact surface 17 of the seal lip member 15. The pumping threads 16 generate the pumping action in such a way that the leaking fluid is pushed back toward the fluid side.

The seal device 1 constructed as stated above includes a pair of the end face seal portion 2 and the seal portion 10 which are arranged to oppose against each other. This construction enables the end face seal portion 2 to be fitted with the rotary shaft 50 and the circumferential seal portion 5H and the side wall seal portion 5V to be brought into secure contact with the step shoulder surfaces of the rotary shaft 50. Therefore, when the first pressure receiving surface S1 receives a fluid pressure, the first pressure receiving surface S1 which is larger in area than the second pressure receiving surface S2 causes an urging force to push the end face seal portion 2 to a fixed position against the step shoulder surface. This also prevents the end face seal portion 2 from coming off toward the seal portion 10 side. As a result, no complex retaining means is needed in order to fix the end face seal portion 2, thus an easy mounting/dismounting is realized.

Further, the rubber made end face seal portion 2 is able to effect a seal against a fluid when the rotary shaft 50 halts. In particular, when the protruding lip member 3 is supported by the backup ring 7, the protruding lip member 3 is capable of exhibiting an outstanding anti-pressure performance even against a high fluid pressure.

The seal lip member 15 made of low frictional synthetic resin can exhibit a seal effect when the rotary shaft 50 rotates. In particular, the pumping threads 16 formed on the seal contact surface 17 enhance the seal effect due to the pumping actions during rotations. When the lip portion 15A of the seal lip member 15 is disposed inward of the inner diameter surface 11A of the seal ring 11, a leaking fluid coming in from the high fluid pressure side P1 exerts an urging pressure, within the inner diameter surface 11A of the seal ring 11, to the outer circumferential surface of the lip portion 15A toward the rotary shaft 50. Thus, the seal capability of the seal contact surface 17 can be improved.

The seal portion 10 can easily be fitted to the mounting bore "A" of the housing 60 through the first packing 21. The first packing 21 retains a plurality of seal portions which are brought into seal contact with the surfaces of the mounting bore "A" of the housing 60 in which these seal portions effect a seal against the housing 60.

Figure 3:
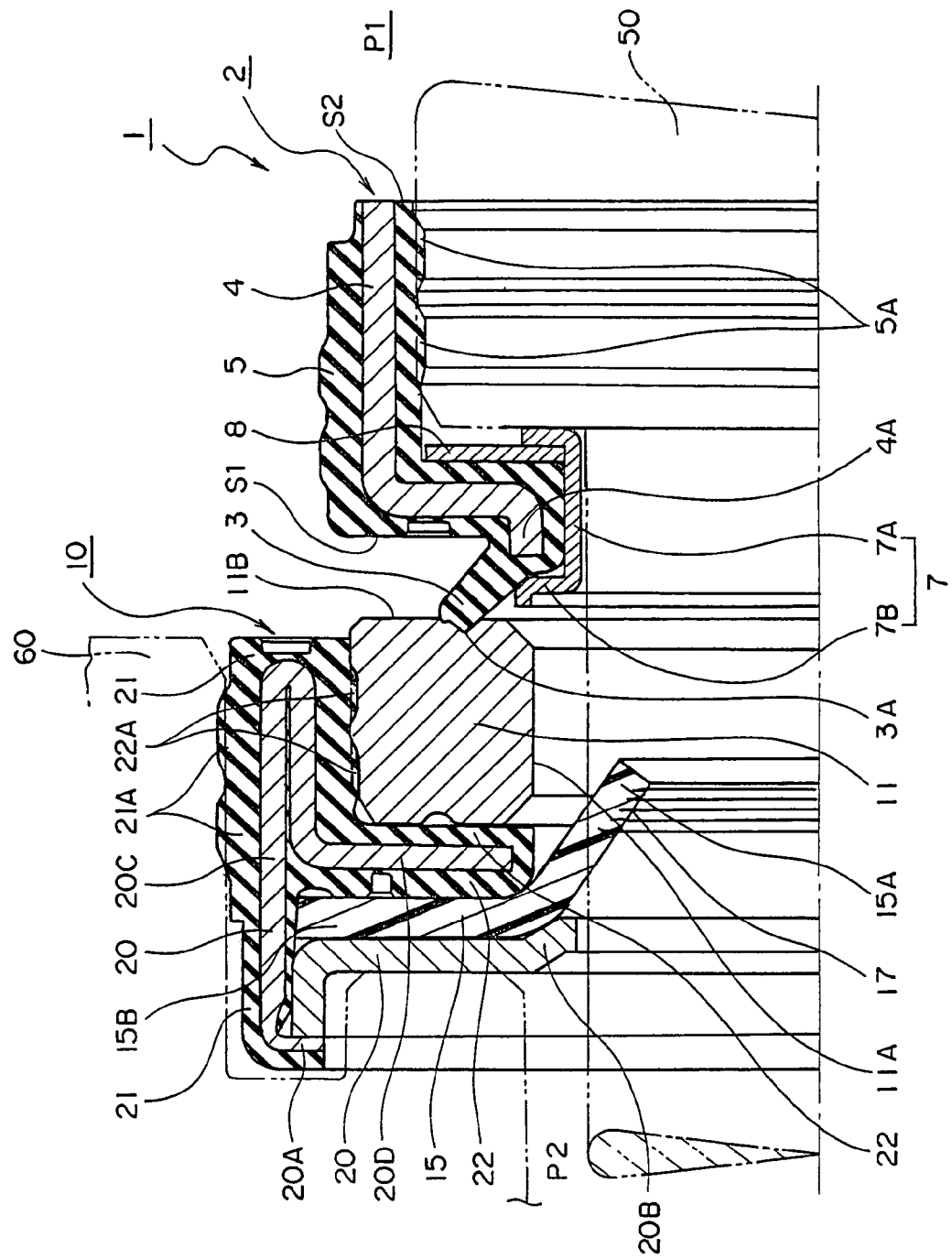
FIG. 3 is a half sectional view showing yet another embodiment of a seal device according to the present invention.

Next, FIG. 3 is a half sectional view showing a third embodiment of a seal device 1 according to the present invention. FIG. 3 shows more or less the same overall arrangement as the seal device 1 in FIG. 1 as indicated by the identical reference numerals. Only different points between the seal device 1 in FIG. 3 and that in FIG. 1 will be stated below.

In FIG. 3, the reinforcement ring 4 of the end face seal portion 2 has an L-shape section and forms an inner diameter support portion 4A at its one end which cylindrically extends toward the protruding lip member 3 side in order to support the protruding lip member 3.

The backup ring 7 has a U-shape section and provides the protruding lip member 3 with a support through the lip support plate 7B, and the total support plate gives a support to the entire reinforcement ring 4 through the inner diameter support portion 4A. The backup ring 7 also holds a retainer plate 8 thereby and retains the end face seal body 5 and reinforcement ring 4 through the retainer plate 8.

The end face seal 2 thus constructed enables a close contact portion 5A of the end face seal body 5 to be brought into close contact with the rotary shaft 50 and provides the protruding lip member 3 with a support through the backup ring 7. That is, the backup ring 7 not only gives a support such that the close contact portion 5A can exhibit a substantial seal effect but also securely retains so that the seal portion 3A of the protruding lip member 3 is brought into close contact with the seal surface 11B. Other arrangements of the end face seal 2 are more or less the same as those in FIG. 1 or FIG. 2 as indicated by the identical reference numerals.

In the seal portion 10, a reinforcement case 20 is comprised of two divided components which are integrated for use. A first reinforcement case 20 has a T-shape section and is embedded between the first packing 21 and the second packing 22. A second reinforcement case 20 is securely clamped by an end portion 20A of the first reinforcement case 20 and gives a support for the seal lip member 15.

In the seal portion 10 thus constructed, the second packing 22 disposes a second seal portion 22A therein. The second packing 22 is brought into seal contact with the two orthogonal surfaces of the seal ring 11 and the second seal portion 22A forming a seal tight contact with the seal ring 11 prevents the sealing object fluid from coming in therethrough.

Further, the first packing 21 disposes a first seal portion 21A which is brought into close contact with an inner circumferential fit surface of the mounting bore of the housing 60. Other arrangements are similar to those with identical reference numerals in FIG. 1 or FIG. 2.

Figure 4:
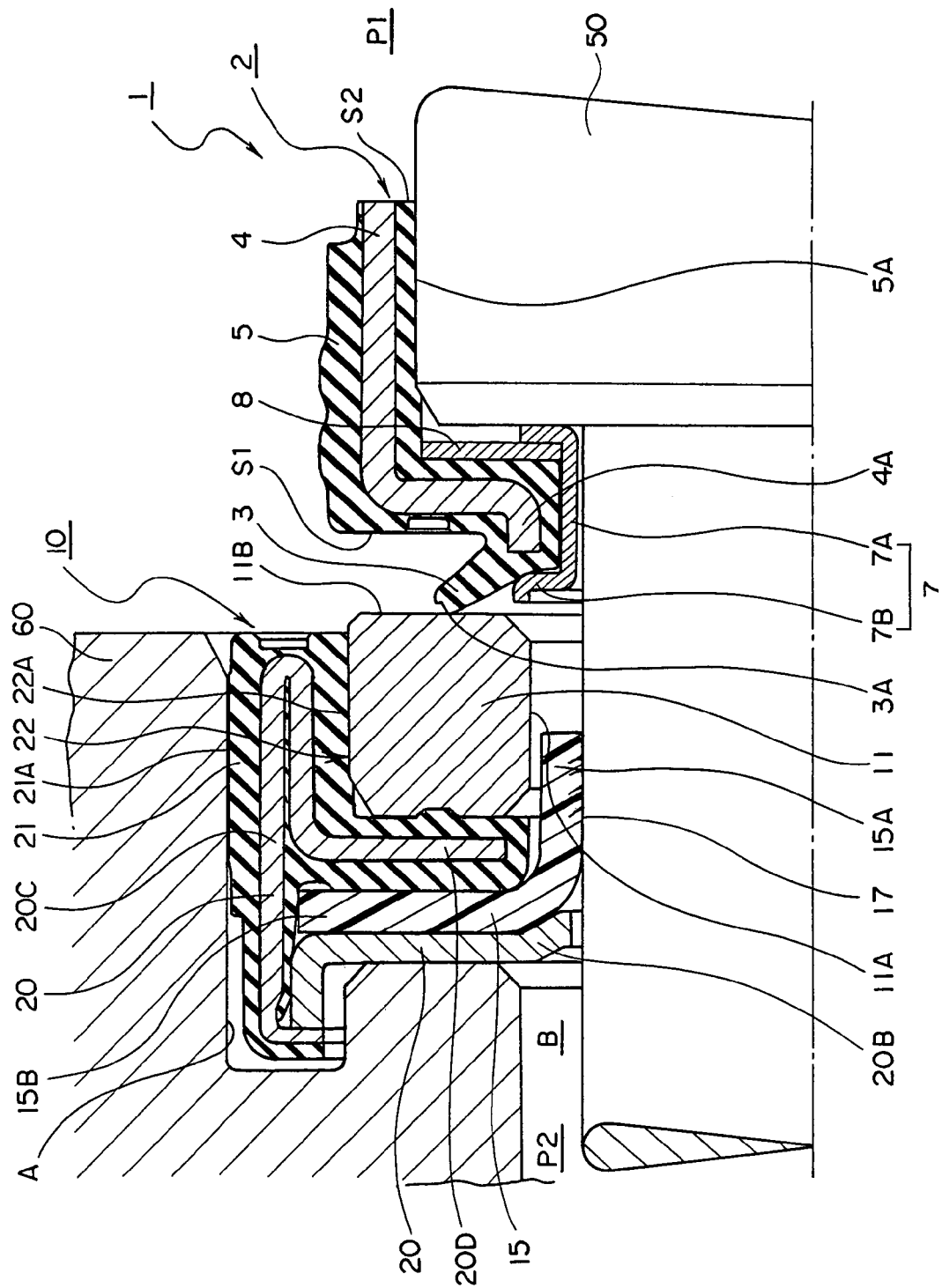
FIG. 4 is a half sectional view showing a seal device in FIG. 3 being mounted on a rotary shaft.
Figure 5:
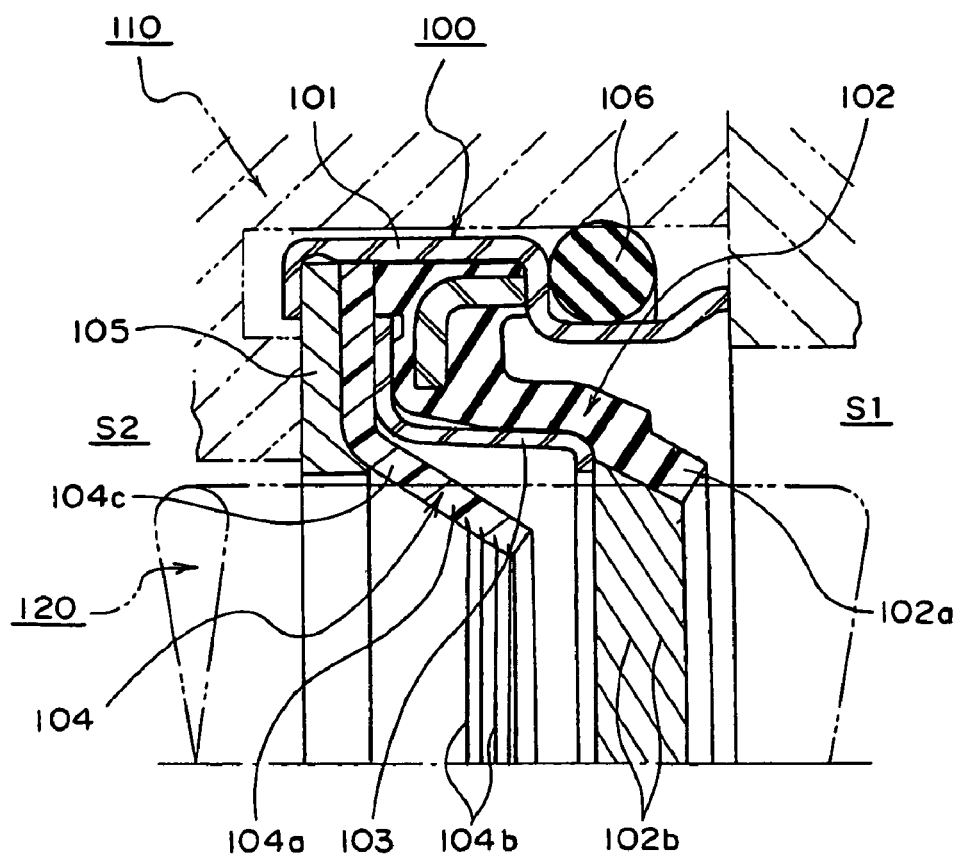
FIG. 5 is a half sectional view showing a conventional seal device related to the present invention.

FIG. 4 is a half sectional view of the seal device 1 shown in FIG. 3 being mounted between the rotary shaft 50 and the housing 60.

In this seal device 1, as stated above, the end face seal 2 is fittingly fixed with the rotary shaft 50 which defines a seal contact portion 5A for effecting a seal at the contact surface with the rotary shaft 50. At the same time, the protruding lip member 3 is supported by the lip support plate 7B of the backup ring 7 which enables a sharp, close contact with the seal surface 11B for effecting a seal against the fluid.

The seal portion 10, on the other hand, is brought into close contact with the housing 60 through the first seal portion 21A. Further, the seal portion 10 is supported by a protruding portion of the housing 60 in its axial direction and clamps the seal lip member 15 between the seal ring 11 and the second reinforcement case 20 through the second packing 22. With the first seal portion 21A, the lip portion 15A is fitted with the rotary shaft 50 and a seal contact surface 17 is brought into close contact with the rotary shaft 50 between the rotary shaft 50 and the seal ring 11.

Thus, the seal ring 11 is fitted with the second seal portion 22A in a seal tight manner and is retained to achieve a substantial verticality of the seal surface 11B, which assures the protruding lip member 3 and the seal surface 11B to be brought into close contact with each other for effecting a seal against the sealing object fluid.

Next, advantages of the present invention will be stated.

According to a seal device 1 related to a preferred embodiment of the present invention, a pair of the end face seal portion 2 and the seal portion 10 are arranged in a mutually opposing manner, thus mounting or dismounting for rotary machines is extremely easy. Also even if either one of the seal portion 10 or the end face seal 2 is worn, only the worn component can be replaced, which reduces the production cost.

The protruding lip member 3 is brought into close contact with the seal surface 11B of the seal ring 11 and generates a suitable contact force thereat depending on the fluid pressure whether the pressure may be high or low. If the fluid pressure is not high, then a sliding resistance can be decreased, which leads to a reduction of the rotary driving energy.

The seal lip member 15 is brought into close contact with the rotary shaft 50 to effect a seal therebetween while the protruding lip member 3 is brought into close contact with the seal ring 11 to effect a seal therebetween, thus a clearance gap is allowed to be formed between the lip portion 15A and the seal ring 11. This prevents frictional heat of the seal lip member 15 due to its sliding motion from being transferred to the protruding lip member 3. As a result, a possible damage in the seal capability caused by softening of the protruding lip member 3 because of a rising temperature by the frictional heat can effectively be prevented.

Also owing to such a arrangement that wear particles produced under a sliding motion of the seal lip member 15 hardly reach the protruding lip member 3 which is disposed in a distal location from the seal lip member 15, an accumulation of the wear particles on the protruding lip member 3 which could wear the seal portion 3A is effectively prevented.

The lip portion 15A of the seal lip member 15 is not directly affected by a high fluid pressure because of the protruding lip member 3 effecting a seal against the fluid. Therefore the lip portion 15A is brought into close contact with the rotary shaft 50 in a desired manner and the sliding friction can be decreased. This yields a decrease in the driving energy of the rotary shaft 50.

According to the seal device 1 of the second embodiment related to the present invention, the seal capability can effectively be improved by providing a seal during the rotation of the rotary shaft 50 by means of the seal lip member 15 being made of a low frictional synthetic resin while providing a seal at a halting state of the rotary shaft 50 by means of the protruding lip member 3 which is made of a rubber material with a high seal capability.

In particular, under circumstances where the rotary shaft repeats stop-and-go motion or the fluid pressure is subject to a random variation between high pressure and low pressure, the combination of the materials for the respective lip portions in the seal device thus arranged exhibits an outstanding performance.

According to the seal device 1 of the third embodiment related to the present invention, if the rotary shaft 50 repeats stop-and-go motion or the fluid pressure repeatedly changes between high pressure and low pressure, the protruding lip member 3 is acted on by a varying pressure. The backup ring 7, however, supports the protruding lip member 3 against the varying pressure for a stable, improved seal performance.

Further, according to the seal device 1 of the fourth embodiment related to the present invention, merely mounting the end face seal 2 onto the rotary shaft 50 enables the end face seal 2 to be securely held against the rotary shaft 50 due to a fluid pressure because the first pressure receiving area S1 in the protruding lip member 3 side is arranged larger than the second pressure receiving area S2 of the opposite surface of the end face seal 2. Therefore, the construction of the mounting portion of the end face seal 2 is arranged extremely simple and its mounting task also can be made straightforward.

According to the seal device 1 of the fifth embodiment related to the present invention, the end face seal 2 can securely be fixed to the rotary shaft 50 by means of the close contact portion 5A which exhibits a substantial surface pressure because the inner circumferential support portion 4A of the reinforcement ring 4 is fittingly supported by the detent 6 which is fixed to the rotary shaft 50. This enables the close contact portion 5A to effect a seal at the fit surface between the end face seal 2 and the rotary shaft 50 and the protruding lip member 3 to strengthen its contact state relative to the seal surface 11B of the seal ring 11.

Also according to the seal device 1 of the sixth embodiment related to the present invention, the seal ring 11 and the lip portion 15A are separated from each other and even a heat generation caused by the sliding motion between the lip portion and the rotary shaft does not affect the protruding lip member 3 because of the separation. Further, the lip portion acted on its outer circumference by the fluid is maintained in close contact with the rotary shaft and enhances the seal performance of the pumping threads 16 of the seal contact surface 17.

Industrial Applicability

A seal device related to the present invention, as stated above, is suited for providing a seal against a sealing object fluid under a high pressure or with a large pressure fluctuation. The seal device exhibits an outstanding seal capability against the sealing object fluid such as gas, liquid, special kind of liquid gas or the like. Therefore the device is effective for use in the seal portions of various kinds of fluid apparatuses, stirrers, compressors or the like.

What is claimed is:

1. A seal device for providing a seal against a sealing object fluid between a rotary shaft and a housing accommodating said rotary shaft extending therethrough, said seal device comprising:
    a seal ring mounted onto said housing and having a seal surface;
    a seal lip member arranged on an opposite side of said seal surface of said seal ring, an outer peripheral portion of said seal lip member being mounted on said housing, said seal lip member having a lip portion that is bent to be parallel relative to a longitudinal axis of said rotary shaft and extends toward a fluid side to be in fitting close contact with said rotary shaft; and
    a face end seal opposing said seal ring and fixed on said rotary shaft in a fluid tight seal manner, said face end seal having a protruding lip member extending from a lower end portion thereof toward said seal surface and being capable of forming close contact with said seal surface,
    wherein said protruding lip member is at an angle to said seal surface in radially outward a direction which is in a pressurized fluid side; and
    wherein said lip portion of said seal lip member is disposed inside an inner diameter surface of said seal ring for effecting a seal against the fluid.

2. The seal device according to claim 1, wherein said seal lip member is made of synthetic resin material and said protruding lip member is made of rubber material.

3. The seal device according to claim 1 or claim 2, wherein a backup ring is disposed on an inner circumferential surface of said protruding lip member and provides support for said protruding lip member.

4. The seal device according to claim 1 or claim 2, wherein a pressure receiving area of said end face seal which said sealing object fluid acts on in an axial direction and is located in an outer circumferential side of said protruding lip member is arranged larger than an opposite pressure receiving area which is located on a back end face of said end face seal.

5. The seal device according to claim 1 or claim 2, wherein said end face seal retains a reinforcement ring which has an inner circumference support portion that is supported by a detent.

6. The seal device according to claim 1 or claim 2, wherein said lip portion of said seal lip member is fitted in said inner diameter surface of said seal ring with a clearance gap defined therebetween.

7. The seal device according to claim 1, wherein said face end seal is fixed directly on said rotary shaft.

8. The seal device according to claim 1, wherein said protruding lip member of said face end seal opposes an axially end face of said seal ring.

9. The seal device according to claim 8, wherein said axially end face of said seal ring is said seal surface.

* * * * *